May 29, 1951 H. C. GRANT, JR Re. 23,370

VALVE

Original Filed Sept. 23, 1946

Inventor

HARRY C. GRANT, JR.

By

Jack Montgomery

Attorney

Reissued May 29, 1951 Re. 23,370

UNITED STATES PATENT OFFICE 23,370

VALVE

Harry C. Grant, Jr., Ridgewood, N. J., assignor to Specialties Development Corporation, Belleville, N. J., a corporation of New Jersey Original No. 2,524,052, dated October 3, 1950, Serial No. 698,843, September 23, 1946. Application for reissue November 1, 1950, Serial No. 193,446

15 Claims. (Cl. 277—9)

Matter enclosed in heavy brackets [ ] appears in the original patent but forms no part of this reissue specification; matter printed in italics indicates the additions made by reissue.

This invention relates to improvements in valves, and is particularly directed to valves for controlling the discharge of high pressure fluid media.

More specifically this invention relates to a valve assembly for containers for high pressure fluid media, wherein the valve member is automatically unseated when coupled to a discharge line; the valve unseating member, carried by the coupling, providing a double seal against leakage, one seal being a metal to metal seal and the other an O-ring seal or doughnut packing. A novel venting ring is provided in the outlet having fluted surfaces for venting pressure trapped in the discharge line or outlet nipple to the atmosphere when uncoupling, which prevents the O-ring from being blown out.

The valve assembly of the present invention may be employed in any high pressure discharge system or apparatus wherein there is a release valve in the discharge line for releasing the medium to a particular point of use, such as oxygen breathing equipment having a manually operable check in or near the mask; or an aircraft fire extinguishing system provided with a direction valve in the discharge line; pneumatic systems, etc. When the valve assembly is coupled to the discharge line and the valve member is thereby unseated, the pressure medium is released from the container into the discharge line and may thereafter be released to the point of use upon opening the valve in the discharge line, without the necessity of the operator first opening the main discharge at the source.

Valves of the character indicated, as heretofore employed, have been operated by various means such as a manually operable handwheel or the like. Such valves, when used in connection with discharge lines having auxiliary or discharge valves, have various disadvantages, one being that the operator often overlooks opening the valve at the source, so that when the auxiliary valve is opened, no fluid medium is discharged to the point of use. The failure to open the valve at the source may be serious. For example, if a pilot of an airplane overlooks opening the valve at the source of fire extinguishing medium or at the source of oxygen supply, and it becomes necessary to have a supply of the medium at a point of use, it may then be too late or otherwise impossible to reach the valve at the source.

Another disadvantage of such valves is that the hand wheel often sticks, making it difficult to open the valve.

A further disadvantage lies in the difficulty in uncoupling the discharge line from the valve structure due to trapped pressure in the line.

With such valves as heretofore constructed difficulty has also been experienced in refilling, recharging and replacing the containers without the loss of fluid.

Accordingly, one of the objects of the present invention resides in the provision of a valve assembly which overcomes the disadvantages above mentioned.

Another object of the present invention resides in the provision of a valve assembly wherein the valve and valve operating means can readily be assembled and will function efficiently under all operating conditions.

Another object resides in the provision of a valve assembly of the character indicated wherein the container can be refilled and recharged through the valve without the loss of any of the medium, and wherein the container, when empty, can be detached from the discharge line and replaced with a filled or charged container without the loss of any of the medium.

A further object of the present invention resides in the provision of a valve assembly so constructed that there can be no accidental discharge of the medium.

A still further object resides in the provision of novel venting means whereby pressure medium trapped in the discharge line or outlet nipple will be readily vented to atmosphere thereby contributing to the efficient operation of the valve, the disconnecting of the discharge line, and the removal of parts of the assembly.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming part of this specification, wherein.

Figure 1:
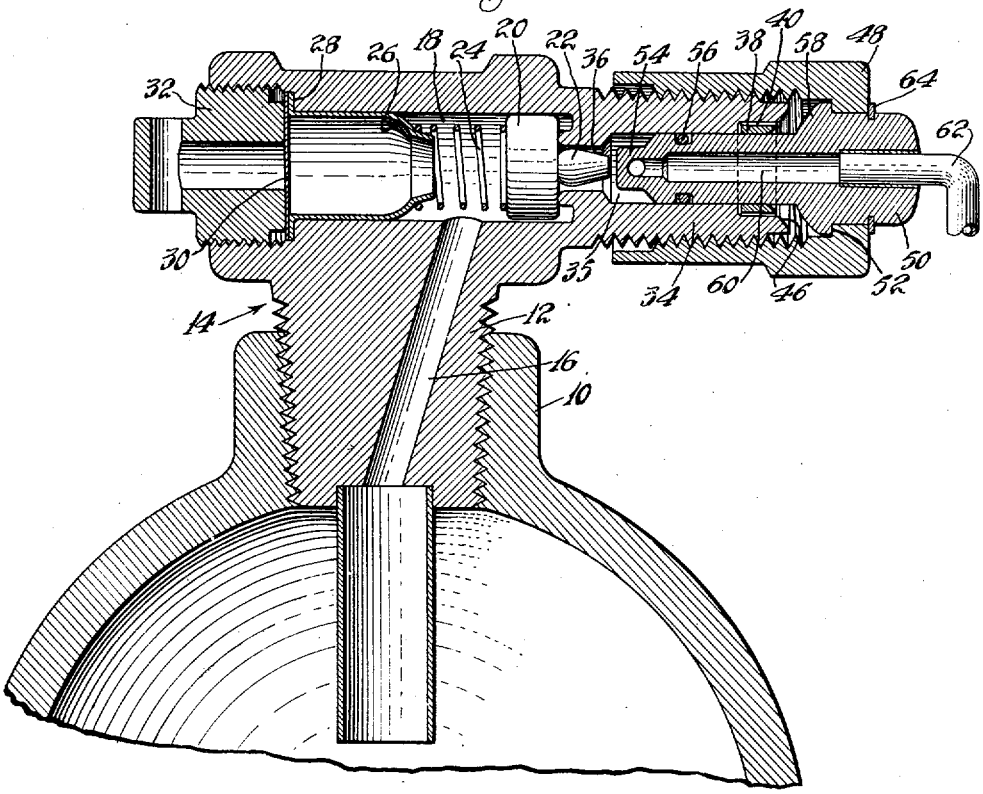
Figure 1 is a sectional view of the valve assembly of the present invention.
Figure 2:
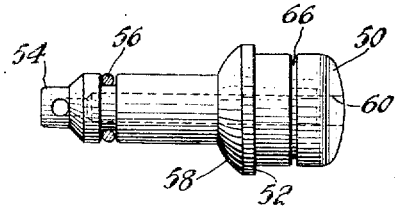
Figure 2 is an elevational view of the valve opening means.
Figure 3:
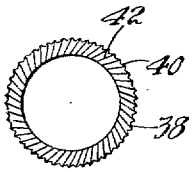
Figure 3 is an enlarged view of one end of a bleeder member employed in the assembly.

In the valve assembly of the present invention, the valve member is unseated by a valve unseating member upon the coupling of a discharge line to the outlet nipple of the assembly, the valve unseating member being provided with a double seal to prevent the escape of the medium from the assembly. The medium, when released, enters a discharge line in which it is held by a normally closed release or discharge valve until the latter valve is opened to permit the release of the medium to a point of use. The release or discharge valve may be a manually operable check valve asssociated with an oxygen breathing mask, for example, or may be a direction or release valve in the discharge line of any high pressure fluid medium release system or equipment. In some instances, such as in oxygen breathing equipment, for example, the release valve may be closed before the entire medium has been discharged from the container, resulting in the trapping of pressure medium in the discharge line and in the outlet nipple; and even when the container has been completely discharged, some pressure medium will be trapped in the outlet nipple. The pressure in the line or in the outlet nipple is prevented from escaping to atmosphere when the coupling is in place, by means of the said double seal, but is vented to the atmosphere during the uncoupling of the discharge line to facilitate the uncoupling thereof, all of which will be apparent from the detailed description which follows.

Referring to the drawing in detail, there is shown a container 10 for storing fluid medium under pressure which is threaded interiorly to receive an exteriorly threaded inlet portion 12 of a valve body 14. The inlet portion 12 has an inlet port or passageway 16 leading from the interior of the container to a valve chamber 18 in the valve body. A valve seat is formed at one end of the valve chamber on which a valve member 20, having a stem or guide 22, is normally held seated by means of a spring 24. The spring 24 is held in position by a thimble-like member 26 having an annular flange at one end engaging a shoulder 28 formed in the end of the valve chamber, whereby the member 26 is supported. A conventional safety disc 30 is held in engagement with the flange of the member 26 by an apertured plug 32.

Figure 4:
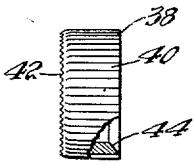
Figure 4 is an elevational view of the latter member, partly in section.

The outlet side of the valve body 14 extends at right angles to the inlet portion 12 and has an outlet nipple 34 which is recessed to provide an outlet chamber 35, which chamber, when the valve member 20 is unseated, communicates with the valve chamber 18 through port 36. The wall of the chamber 35 is counterbored at its outlet end to receive a bushing or bleeder member 38 held therein by a press fit. This bushing as will be seen from Fig. 4 is provided with a plurality of transverse grooves or knurling 40 on its periphery and with communicating radial grooves or knurling 42 on its inner edge, the latter grooves or knurling communicating with the outlet chamber. The knurling on this bushing provides a plurality of minute bleeding passageways for the outlet chamber, the purpose of which will be described hereinafter in greater detail. The outer edge of this bushing is bevelled as shown at 44 (Fig. 4), and the outer end of the wall of the outlet chamber is correspondingly bevelled at 46.

The outlet nipple 34 is exteriorly threaded to receive an apertured coupling nut 48 which carries a valve operating member 50 comprising an elongated cylindrical body having a shoulder 52 substantially midway of its ends. The body is reduced in diameter on one side of this shoulder and is provided at the inner end of the reduced portion with a nose 54. The reduced portion has an annular groove intermediate the shoulder 52 and the nose 54 which accommodates a doughnut packing or O ring 56. This packing is preferably of resilient material and engages the inner wall of the outlet chamber to provide a gastight seal. The shoulder 52 has a substantially hemispherical face 58 providing a metal to metal seal between that face and the bevelled outer end of the outlet nipple. The member 50 has a central bore 60 extending from its nose 54 to the outer end thereof, which end extends outwardly of the aperture in the nut. The outer end of the bore 60 is counterbored to receive a conduit 62, which may be screwed into, welded, or otherwise secured to the member 50.

The member 50 has a retaining ring 64 carried in an annular groove 66 formed in the periphery of the member at its outer end, which ring cooperates with the shoulder 52 to mount the nut 48 and the member 50 for relative rotation. The end of the nut opposite its apertured end projects beyond the nose 54 of the member 50 to provide a protecting shield therefor when the nut 48 and the member 50 are disconnected from the outlet nipple 34.

In assembling the valve structure, the valve member is inserted in the valve chamber with its stem or guide 22 in the port 36, to the spring 24, the thimble-like member 26 and the safety disc 30 are then inserted, and finally the plug is secured which holds the parts in their proper positions as shown in Figure 1. The valve assembly is then ready to be screwed into the neck of the container, and the container may then be filled or charged with the desired fluid pressure medium by coupling a pipe line to the outlet nipple, the pressure of the medium will unseat the valve member, and the valve member will remain unseated until the pressure in the container exceeds that of the pressure in the filling line, or until the flow of the filling medium is shut off, whereupon the valve member will be seated under the action of the spring 24 aided by the pressure medium in the container. The charging device is then disconnected and the coupling 48 with the valve operating member 50 is screwed on the outlet nipple.

As will be seen from Figure 1, as the coupling nut is screwed into position, it will move the valve operating member 50 to the left, as viewed in Figure 1, whereupon the nose 54 of the member will engage valve stem 22 and move the valve member off its seat, whereby the fluid presure medium will be conducted from the container through passageway 16 to the valve chamber 18, through port 36 into the outlet chamber 35, thence through the central bore 60 in the valve operating member 50 to the discharge conduit 62.

When the valve operating member has been moved sufficiently to unseat the valve member, in the manner described, a double seal is provided against the leakage of the fluid pressure medium, so that all of the medium passes through the bore 60 in the valve operating member directly to the conduit 62. The doughnut packing 56 serves as a seal between the member 50 and the wall of the outlet chamber, and the metal to metal contact between the bevelled face 46 on the outlet nipple and the hemispherical face 58 on the shoulder 52 of the valve operating member provides a second seal. The latter seal is a conventional ball and cone seal and serves as the permanent seal when the coupling nut is screwed into place.

When the pressure medium has been discharged in the manner described and a valve (not shown) in the discharge line 62 is closed, a certain quantity of the medium will be trapped in the discharge line and in the outlet chamber. When the coupling nut 48 is backed off the outlet nipple to remove the same and the valve operating member, whereby the container may be refilled or a new container substituted, the ball and cone seal, provided by the hemispherical face 58 of the shoulder 52 and bevelled face 46 of the outlet nipple 34 is broken, and, as the doughnut packing reaches the bleeder bushing 38, the trapped pressure medium is vented to atmosphere by why of the knurling on the bushing or ring 38 and the threads of the coupling nut.

When the metal to metal seal is broken and the valve operating member 50 is being withdrawn, the outer end of the outlet chamber 35 is vented to the atmosphere through the threads of the coupling nut 48, and the pressure of the medium trapped in the outlet chamber 35 at its inner end, tends to expand the packing ring outwardly into tight contact with the wall of the chamber. Should there be no means for venting the chamber, the packing, upon reaching the conical portion, or bevelled end 46, of the outlet, would be blown out of its groove and permanently damaged.

In the structure of the present invention the grooves or knurling on the inner face of the bleeding ring which communicate with the grooves or knurling on the periphery of the ring serve as minute bleeding or venting passageways leading to atmosphere through the threads of the coupling nut 48. This venting is sufficiently rapid to permit withdrawal of the coupling irrespective of the high degree of the pressure of the trapped medium or the length of the conduit 62. The venting passageways are so minute that the packing ring can move past them in tight contact with the wall of the chamber without any injury to the packing ring.

The inner wall of the bleeding ring 38 is smooth and of the same diameter as the bore of the outlet chamber, whereby a continuous smooth surface is provided for the withdrawal of the valve operating member and its packing ring without any damage to the latter. When the packing ring passes the radial venting passageways on the inner edge of the bleeding ring 38, the pressure medium is vented, thereby relieving the pressure on the packing ring and permitting the ring to resume its normal contracted condition in its groove, in which condition it continues outwardly of the outlet chamber along the smooth inner wall of the bleeding ring and is removed from the valve body.

When the coupling and the valve operating member have been removed from the valve body, a conventional filling device may be coupled to the outlet nipple and the container refilled or recharged in the conventional manner, the pressure of the medium entering the valve body by way of the outlet unseating the valve member. Instead of relying on the pressure of the charging medium to unseat the valve, if desired a projection may be provided on the charging device to enter the outlet chamber for unseating the valve member. The particular recharging or refilling device forms no part of the present invention, hence no illustration thereof is deemed necessary.

When the container is recharged or refilled, the pressure of the medium in the container will aid the spring 24 in seating the valve member 20.

From the foregoing it will be seen that the valve structure of the present invention can readily be connected to the discharge line without the loss of any of the pressure medium; and that in disconnecting the discharge line, trapped pressure medium is automatically vented to atmosphere to facilitate disconnecting. It will also be seen that the valve structure has a neat appearance, and is devoid of any projecting handwheels or levers, which aside from being unsightly are often accidentally struck resulting in the opening of the valve.

It will also be seen that when a cylinder or container is provided with the valve assembly of the present invention the valve member 20 is held on its seat by the combined forces of the spring 24 and the pressure medium, whereby the escape of the pressure medium is prevented when the coupling nut 48 is removed, so that replacing of empty containers with filled or charged containers can readily be accomplished without the loss of any of the medium.

It will also be seen that when the discharge line is coupled to the valve structure the valve is automatically opened, whereby it becomes unnecessary to rely on the operator to manually open the same.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A valve for controlling the discharge of high pressure fluid medium comprising a valve body having an inlet passageway and an outlet chamber with a valve chamber and valve seat therebetween; a valve member in said valve chamber; a valve unseating member slidable in the outlet chamber relatively to the valve member and having a longitudinal bore therethrough; *means providing a seal between said valve unseating member and said* [sealing means carried by said valve unseating member for sealing the] outlet chamber to prevent the escape of the medium about said *valve unseating* member; and venting means for the outlet chamber operable when the valve unseating member has been retracted to a predetermined position within the outlet chamber.

2. A valve for controlling the discharge of high pressure fluid medium comprising a valve body having an inlet passageway and an outlet chamber with a valve chamber and valve seat therebetween; a valve member in said valve chamber; a valve unseating member slidable in the outlet chamber and having a longitudinal bore therethrough; coupling means for coupling said valve unseating member to the valve body and for advancing and retracting said valve unseating member in the outlet chamber; sealing means carried by said valve unseating member for sealing the outlet chamber to prevent the escape of the medium about said valve unseating member; and venting means in the wall of the outlet chamber operable when the valve unseating member has been retracted to a predetermined position within said outlet chamber.

3. A valve for controlling the discharge of high pressure fluid medium comprising a valve body having an inlet passageway and an outlet chamber with a valve chamber and valve seat therebetween; a valve member in said valve chamber; a valve unseating member slidable in the outlet chamber into engagement with the valve member to unseat the same and having a longitudinal bore therethrough; a resilient sealing ring carried in an annular groove in said valve unseating member for sealing the outlet chamber to prevent the escape of the medium about said valve unseating member; and a bleeding member in the wall of the outlet chamber operable to bleed the outlet chamber when the valve unseating member has been retracted to bring the sealing means into juxtaposition therewith.

4. A valve for controlling the discharge of high pressure fluid medium comprising a valve body having an inlet passageway and an outlet chamber with a valve chamber and valve seat therebetween; a valve member in said valve chamber; a valve unseating member slidable in the outlet chamber and having a longitudinal bore therethrough; sealing means carried by said valve unseating member for sealing the outlet chamber to prevent the escape of the medium about said valve unseating member; and a ring in the wall of the outlet chamber having transverse grooves on its periphery providing venting means for the outlet chamber and operable when the valve unseating member has been retracted to a predetermined position within the outlet chamber.

5. A valve for controlling the discharge of high pressure fluid medium comprising a valve body having an inlet passageway and an outlet chamber with a valve chamber and valve seat therebetween; a valve member in said valve chamber; a valve unseating member normally out of operative engagement with the valve member when the latter member is seated on said seat, and being slidable in the valve chamber into engagement with the valve member to unseat the same; means for advancing and retracting said valve unseating member; sealing means carried by said valve unseating member for sealing the outlet chamber to prevent the escape of the medium about said valve unseating member; the wall of said outlet chamber having a plurality of minute bleeding passageways adjacent the outlet end thereof for venting the outlet chamber when the valve unseating member has been retracted to bring the sealing means into juxtaposition therewith.

6. A valve for controlling the discharge of high pressure fluid medium comprising a valve body having an inlet passageway and an outlet chamber with a valve chamber and valve seat therebetween; a valve member in said valve chamber; a valve unseating member adapted for reciprocatory movement in the outlet chamber and having a longitudinal bore therethrough; means for imparting movement to said valve unseating member to advance and retract the same in the outlet chamber [sealing means carried by said valve unseating member for sealing the] *means providing a seal between said valve unseating member and said* outlet chamber to prevent the escape of the medium about said valve unseating member; and [a second] sealing means on said valve unseating member cooperating with the outlet chamber wall to seal that chamber when the valve unseating member has been advanced to unseat the valve.

7. A valve for controlling the discharge of high pressure fluid medium comprising a valve body having an inlet passageway and an outlet chamber with a valve chamber and valve seat therebetween; a valve member in said valve chamber; a valve unseating member slidable in the outlet chamber and having a longitudinal bore therethrough; means for advancing and retracting said valve unseating member; *means providing a seal between said valve unseating member and said* [sealing means carried by said valve unseating member for sealing the] outlet chamber to prevent the escape of the medium about said valve unseating member; [a second] sealing means on said valve unseating member cooperating with the end of the outlet chamber wall to seal that chamber when the valve unseating member has been advanced to unseat the valve; and venting means for the outlet chamber operable when the valve unseating member has been retracted to bring the first sealing means into juxtaposition therewith.

8. A valve for controlling the discharge of high pressure fluid medium comprising a valve body having an inlet passageway and an outlet chamber with a valve chamber and valve seat therebetween; a valve member in said valve chamber; a valve unseating member slidable in the outlet chamber and having a longitudinal bore therethrough; means for advancing and retracting said valve unseating member; sealing means carried by said valve unseating member for sealing the outlet chamber to prevent the escape of the medium about said valve unseating member; and a knurled venting ring secured in the wall of the outlet chamber adjacent the outlet end thereof and operable when the valve unseating member has been retracted to bring the sealing means to a position within the ring to permit the escape of fluid medium from the outlet chamber to atmosphere.

9. A valve for controlling the discharge of high pressure fluid medium comprising a valve body having an inlet passageway and an outlet chamber with a valve chamber and valve seat therebetween; a valve member in said valve chamber; a valve unseating member slidable in the outlet chamber and having a longitudinal bore therethrough; means for advancing and retracting said valve unseating member; sealing means carried by said valve unseating member for sealing the outlet chamber to prevent the escape of the medium about said valve unseating member; and a venting ring in the wall of the outlet chamber provided with a plurality of grooves on its inner edge and transverse communicating grooves on its periphery providing vent passage from the outlet chamber to atmosphere, said vent passages being operable when the valve unseating member has been retracted to a position beyond said first mentioned grooves to permit the escape of fluid medium from the outlet chamber to atmosphere.

10. A valve for controlling the discharge of high pressure fluid medium comprising a metal valve body having an inlet passageway and an outlet chamber with a valve chamber and valve seat therebetween; a valve member in said valve chamber; a metal valve unseating member slidable in the outlet chamber and having a longitudinal bore therethrough; means for advancing and retracting said valve unseating member; sealing means carried by said valve unseating member for sealing the outlet chamber to prevent the escape of the medium about said valve unseating member; said valve unseating member having a shoulder adapted to engage the end wall of the outlet chamber providing a metal to metal seal for the outlet chamber, when the valve unseating member has been advanced to unseat the valve; and a knurled venting ring in the wall of the outlet chamber operable when the valve unseating member has been retracted to a position within the ring to permit the escape of fluid medium from the outlet chamber to atmosphere.

11. A valve for controlling the discharge of high pressure fluid medium comprising a metal valve body having an inlet passageway and an outlet chamber with a valve chamber and valve seat therebetween; a valve member in said valve chamber; a metal valve unseating member slidable in the outlet chamber and having a reduced end portion at its inner end for engaging the valve member; means for advancing and retracting said valve unseating member; said valve unseating member having an annular groove in its outer wall; sealing means carried in said groove for sealing the outlet chamber to prevent the escape of the medium about said valve unseating member; and a venting ring in the wall of the outlet chamber having grooves on its periphery and one edge in communication with each other and with the outlet chamber; said venting ring being operable to vent the chamber to atmosphere when the valve unseating member has been retracted to bring the sealing means to a position within said ring.

12. A valve for controlling the discharge of high pressure fluid medium comprising a valve body having an inlet passageway, an outlet passageway and a valve chamber intermediate the passageways; a valve member and a valve seat in said valve chamber; a valve unseating member slidable in the outlet passageway and having a longitudinal bore therethrough; a coupling nut for coupling said valve unseating member to the valve body and for advancing and retracting the valve unseating member in the outlet passageway; said nut having a projecting shell extending beyond the inner end of the valve unseating member and providing a shield therefor; sealing means carried by said valve unseating member for sealing the outlet passageway to prevent the escape of the medium about said valve unseating member and to insure the discharge of the medium through said bore; and a knurled venting ring in the wall [of the outlet chamber] *providing the outlet passageway* operable when the valve unseating member has been retracted to a predetermined point in the outlet passageway to permit the escape of fluid medium from the outlet passageway by way of the knurling on the ring to atmosphere.

*13. A valve for controlling the discharge of high pressure fluid medium comprising a valve body having an inlet passageway and an outlet chamber with a valve chamber and valve seat therebetween; a valve member in said valve chamber; a valve unseating member slidable in the outlet chamber relatively to the valve member and having a longitudinal bore therethrough; sealing means carried by said valve unseating member for sealing the outlet chamber to prevent the escape of the medium about said valve unseating member; and venting means for the outlet chamber operable when the valve unseating member has been retracted to a predetermined position within the outlet chamber.*

*14. A valve for controlling the discharge of high pressure fluid medium comprising a valve body having an inlet passageway and an outlet chamber with a valve chamber and valve seat therebetween; a valve member in said valve chamber; a valve unseating member adapted for reciprocatory movement in the outlet chamber and having a longitudinal bore therethrough; means for imparting movement to said valve unseating member to advance and retract the same in the outlet chamber; sealing means carried by said valve unseating member for sealing the outlet chamber to prevent the escape of the medium about said valve unseating member; and a second sealing means on said valve unseating member cooperating with the outlet chamber wall to seal that chamber when the valve unseating member has been advanced to unseat the valve.*

*15. A valve for controlling the discharge of high pressure fluid medium comprising a valve body having an inlet passageway and an outlet chamber with a valve chamber and valve seat therebetween; a valve member in said valve chamber; a valve unseating member slidable in the outlet chamber and having a longitudinal bore therethrough; means for advancing and retracting said valve unseating member; sealing means carried by said valve unseating member for sealing the outlet chamber to prevent the escape of the medium about said valve unseating member; a second sealing means on said valve unseating member cooperating with the end of the outlet chamber wall to seal that chamber when the valve unseating member has been advanced to unseat the valve; and venting means for the outlet chamber operable when the valve unseating member has been retracted to bring the first sealing means into juxtaposition therewith.*

HARRY C. GRANT, JR.

REFERENCES CITED

The following references are of record in the file of this patent or the original patent:

UNITED STATES PATENTS

| Number | Name | Date |
|---|---|---|
| 1,348,708 | Garland | Aug. 3, 1920 |
| 1,409,270 | Yearsley | Mar. 14, 1922 |
| 1,566,111 | Miller | Dec. 15, 1925 |